US010618562B2

(12) United States Patent
Shimizu

(10) Patent No.: US 10,618,562 B2
(45) Date of Patent: Apr. 14, 2020

(54) VEHICLE FRONT PORTION STRUCTURE

(71) Applicant: TOYOTA JIDOSHA KABUSHIKI KAISHA, Aichi-ken (JP)

(72) Inventor: Kazuki Shimizu, Kariya (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 37 days.

(21) Appl. No.: 15/927,303

(22) Filed: Mar. 21, 2018

(65) Prior Publication Data

US 2018/0312198 A1    Nov. 1, 2018

(30) Foreign Application Priority Data

Apr. 28, 2017    (JP) .................. 2017-090359

(51) Int. Cl.
| | | |
|---|---|---|
| *B62D 21/15* | (2006.01) | |
| *B62D 21/11* | (2006.01) | |
| *B60K 1/04* | (2019.01) | |
| *B62D 27/04* | (2006.01) | |
| *B62D 25/08* | (2006.01) | |

(52) U.S. Cl.
CPC ............. *B62D 21/155* (2013.01); *B60K 1/04* (2013.01); *B62D 21/11* (2013.01); *B62D 25/082* (2013.01); *B62D 27/04* (2013.01); *B60K 2001/0411* (2013.01); *B60K 2001/0438* (2013.01); *B60Y 2306/01* (2013.01)

(58) Field of Classification Search
CPC ..... B62D 27/04; B62D 25/082; B62D 21/155; B62D 21/11; B60K 1/04; B60K 2001/0411; B60K 2001/0438; B60Y 2306/01
See application file for complete search history.

(56) References Cited

U.S. PATENT DOCUMENTS

2012/0049571 A1    3/2012    Katou et al.

FOREIGN PATENT DOCUMENTS

JP          2012-045995 A    3/2012

*Primary Examiner* — D Glenn Dayoan
*Assistant Examiner* — Melissa Ann Bonifazi
(74) *Attorney, Agent, or Firm* — Hauptman Ham, LLP

(57) ABSTRACT

A vehicle front portion structure that includes: a suspension member that is provided further toward a vehicle front side than a battery accommodating portion, and that has a pair of side rails that are disposed with an interval therebetween in a vehicle transverse direction and that extend in a vehicle longitudinal direction; and connecting members that connect rear portions of the side rails and a front portion of the battery accommodating portion, and at which deforming portions that, due to input of collision load to the side rails from a vehicle front side, deform such that the rear portions of the side rails move toward a vehicle lower side with respect to the front portion of the battery accommodating portion are formed, the connecting members being formed by members having higher ductility than the side rails.

20 Claims, 6 Drawing Sheets

VEHICLE FRONT PORTION STRUCTURE

CROSS-REFERENCE TO RELATED APPLICATION

This application is based on and claims priority under 35 USC 119 from Japanese Patent Application No. 2017-090359 filed on Apr. 28, 2017, which is incorporated by reference herein.

BACKGROUND

Technical Field

The present disclosure relates to a vehicle front portion structure.

Related Art

As a structure for carrying out impact absorption at the time of a front collision, there is known a technique in which impact is absorbed due to side members, which are vehicle body frame members, being deformed, or the front suspension members being rotated. For example, in Japanese Patent Application Laid-Open (JP-A) No. 2012-45995, there is a structure that, in an electric automobile, axially crushes the side members, and rotation promoting structures such as weak portions or the like are provided at the front suspension members. In this structure, impact absorption at the time of a front collision is carried out due to bending of the front suspension members with respect to load input from the front side being promoted, in addition to the axial crushing of the side members.

However, in the structure disclosed in JP-A No. 2012-45995, the suspension members themselves must be bent, and the ductility of the members that form the suspension members themselves must be high, and the degrees of freedom in designing the suspension members are low. Further, JP-A No. 2012-45995 does not disclose the stored position of the battery, and mitigating of the input of impact to the battery is unclear.

SUMMARY

In view of the above-described circumstances, an object of the present disclosure is to provide a vehicle front portion structure that, with respect to impact from a vehicle front side, can mitigate input of impact to a battery while ensuring the degrees of freedom in the designing of a suspension member.

An aspect of a vehicle front portion structure that includes: a battery accommodating portion that is disposed at a vehicle lower side of a vehicle cabin, and in which a battery is to be accommodated; a suspension member that is provided further toward a vehicle front side than the battery accommodating portion, and that has a pair of side rails that are disposed with an interval therebetween in a vehicle transverse direction and that extend in a vehicle longitudinal direction; and connecting members that connect rear portions of the side rails and a front portion of the battery accommodating portion, and at which deforming portions that, due to input of collision load to the side rails from a vehicle front side, deform such that the rear portions of the side rails move toward a vehicle lower side with respect to the front portion of the battery accommodating portion are formed, the connecting members being formed by members having higher ductility than the side rails.

DESCRIPTION OF EMBODIMENTS

A vehicle front portion structure relating to an embodiment of the present disclosure is described with reference to FIG. 1 through FIG. 5. Note that the vehicle vertical direction upper side is indicated by arrow UP, the vehicle longitudinal direction front side is indicated by arrow FR, and the vehicle transverse direction is indicated by arrow W. Further, in the following description, when longitudinal, vertical and left-right directions are used, they refer to the longitudinal of the vehicle longitudinal direction, the vertical of the vehicle vertical direction, and the left and the right when the advancing direction is forward, unless otherwise indicated.

A vehicle 12 to which a vehicle front portion structure 10 is applied is described first.

Figure 1:
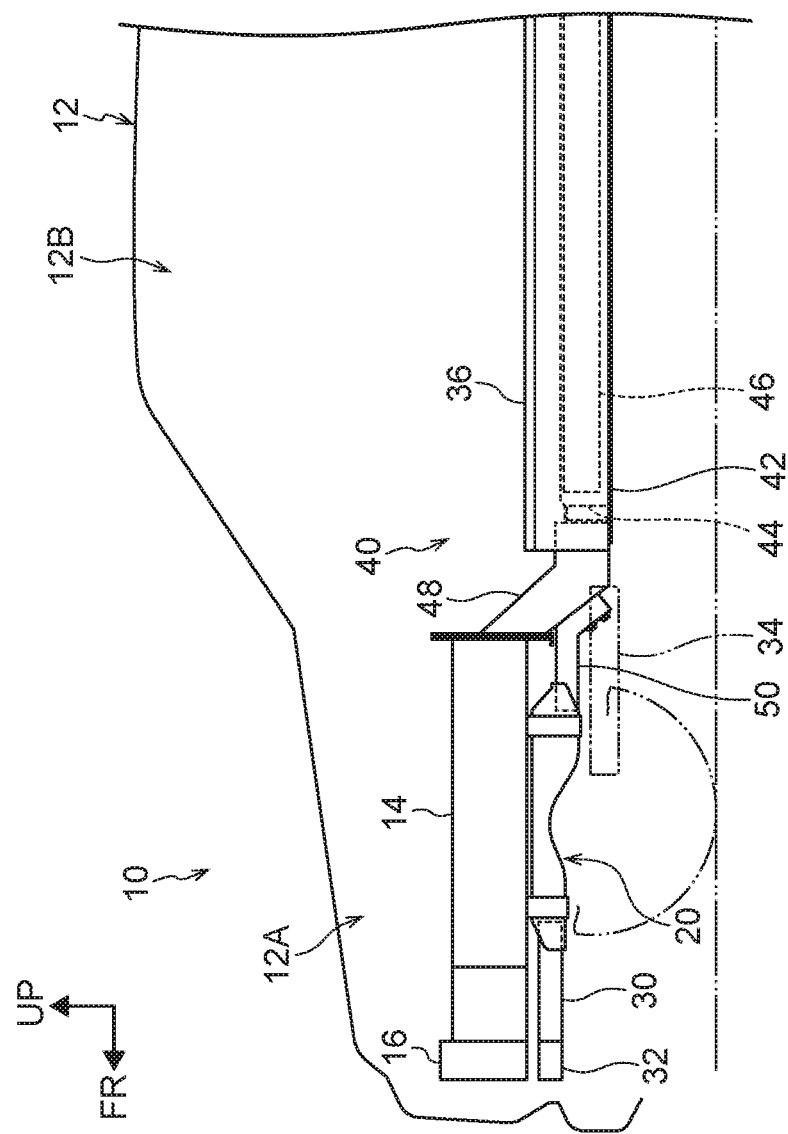
FIG. 1 is a side view showing an overview of the front side of a vehicle to which a vehicle front portion structure of a present embodiment is applied.

As shown in FIG. 1, the vehicle is an electric automobile, and has a vehicle front portion chamber 12A and a vehicle cabin 12B. The vehicle front portion chamber 12A is disposed at the vehicle front side, and various types of members such as electrical components, a gear box, auxiliary equipment, and the like are accommodated at the interior thereof. The vehicle cabin 12B is disposed adjacent to the rear side of the vehicle front portion chamber 12A.

Figure 2:
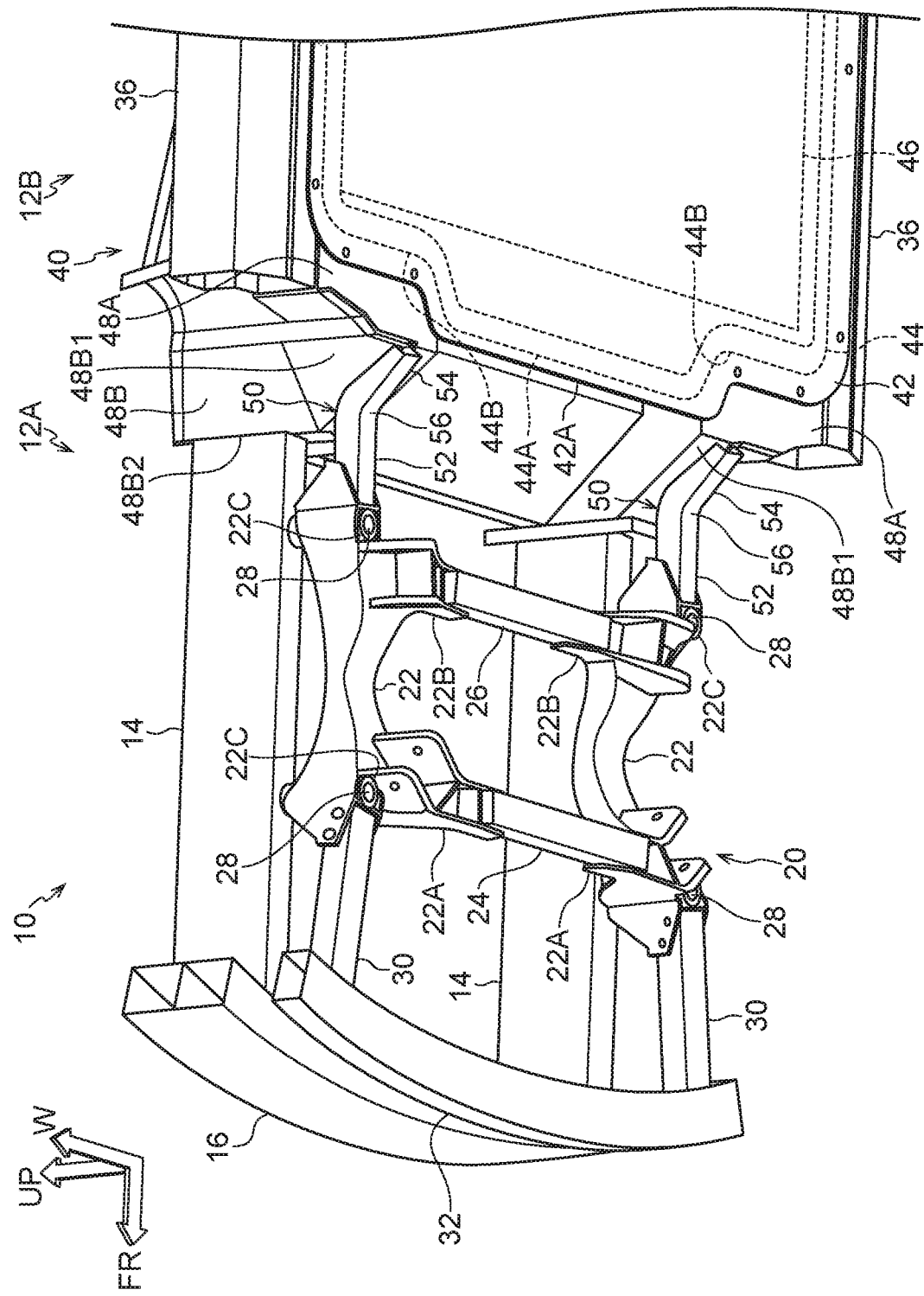
FIG. 2 is a perspective view from the lower side of the vehicle front portion structure of the present embodiment.
Figure 3:
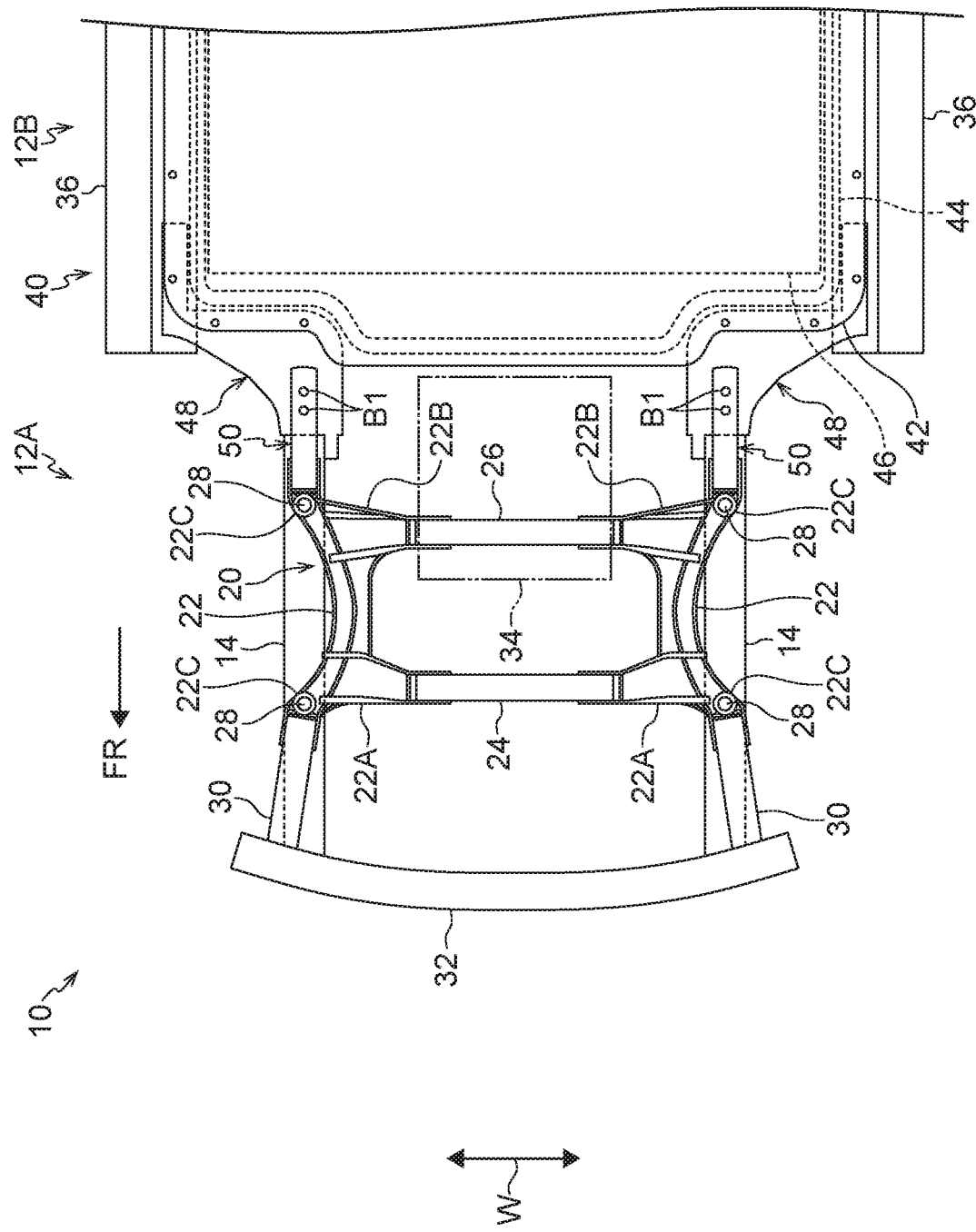
FIG. 3 is a bottom view showing the vehicle front portion structure of the present embodiment.

Front side members 14 that are vehicle frame members are disposed at the vehicle front portion chamber 12A. As shown in FIG. 2 and FIG. 3, the front side members 14 are a pair of left and right vehicle frame members that extend in the vehicle longitudinal direction at the both side end portions in the vehicle transverse direction.

A front reinforcement 16 is mounted to the front ends of the front side members 14. The front reinforcement 16 extends in the vehicle transverse direction, and connects the front ends of the pair of front side members 14. The rear ends of the front side members 14 are connected to battery front side portions 48 of a battery accommodating portion 40 that is described later.

Figure 4:
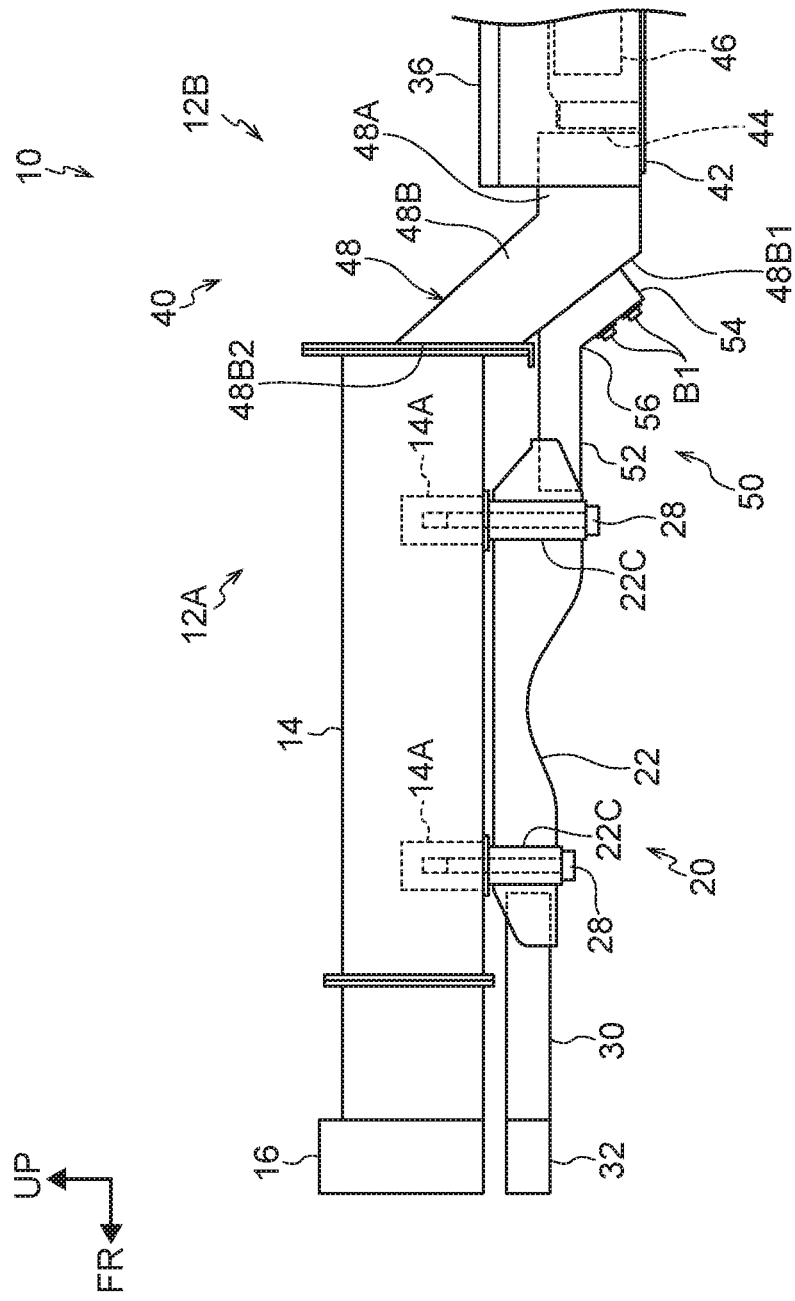
FIG. 4 is a side view showing the vehicle front portion structure of the present embodiment.

A suspension member 20 is disposed at the lower sides of the front side members 14. The suspension member 20 has a pair of side rails 22, a front cross member 24, and a rear cross member 26. As shown in FIG. 4, the pair of side rails 22 are disposed at the lower sides of the front side members 14. The pair of side rails 22 are respectively disposed so as to be apart from the front side members 14 and so as to be substantially parallel to the front side members 14 as seen in a side view. As shown in FIG. 3, the respective side rails 22 are made to be shapes that are gently curved such that the vehicle longitudinal direction intermediate portions thereof are convex toward the vehicle transverse direction inner side.

A side front end portion 22A that projects-out toward the vehicle transverse direction inner side is formed at the front end portion of the side rail 22. A side rear end portion 22B that projects-out toward the vehicle transverse direction inner side is formed at the rear end portion of the side rail 22. The side front end portions 22A of the pair of side rails 22 face one another in the vehicle transverse direction, and are connected together by the front cross member 24. The side rear end portions 22B of the pair of side rails 22 face one another in the vehicle transverse direction, and are connected together by the rear cross member 26.

Further, a bolt fastening portion 22C is formed at the front end portion and the rear end portion of the side rail 22 respectively. A bolt 28 is inserted into the bolt fastening portion 22C from the lower side, and is fastened to a bolt fastening portion 14A that is formed at the front side member 14. The respective side rails 22 are supported by the bolts 28 at the vehicle longitudinal direction both end portions, so as to hang-down from the front side members 14.

The side rail 22, the side front end portion 22A and the side rear end portion 22B are structured integrally. In the present embodiment, the side rail 22, the side front end portion 22A and the side rear end portion 22B are manufactured by aluminum die casting by using aluminum as the main material. Further, the front cross member 24 and the rear cross member 26 are aluminum extrusion molded products that are manufactured by extrusion molding aluminum.

Lower side members 30 are connected to the respective front end portions of the pair of side rails 22. The lower side members 30 extend-out toward the vehicle front side from the front end portions of the side rails 22. A lower reinforcement 32 is mounted to the front ends of the lower side members 30. The lower reinforcement 32 extends in the vehicle transverse direction, and connects the front ends of the pair of lower side members 30. Further, the lower reinforcement 32 is disposed directly beneath the front reinforcement 16 so as to overlap the front reinforcement 16 in the vehicle vertical direction.

A pair of rocker members 36 are disposed at the lower side of the vehicle cabin 12B, at the both outer side ends in the vehicle transverse direction. The rocker members 36 extend in the vehicle longitudinal direction. The rocker members 36 have closed cross-sections, and structure a pair of left and right vehicle frame members.

The battery accommodating portion 40 is provided between the pair of rocker members 36. The battery accommodating portion 40 is disposed at the lower side of the vehicle cabin 12B, and has a bottom plate 42, a battery frame portion 44, a battery 46, and the battery front side portions 48.

The bottom plate 42 is shaped as a substantially rectangular plate, and covers the entire battery accommodating portion 40 from the lower side thereof. A convex portion 42A that is convex toward the front side is formed integrally with the central portion of the front side of the bottom plate 42. The battery frame portion 44 is shaped as a frame that has a uniform height, and is disposed along the outer edge of the bottom plate 42. A convex frame portion 44A is formed at the battery frame portion 44 at the portion, which corresponds to the convex portion 42A, of the front side. Front concave portions 44B are formed at the vehicle transverse direction both sides of the front end that sandwich the convex frame portion 44A of the battery frame portion 44 therebetween. The battery 46 is accommodated on the bottom plate 42 that is at the inner side of the battery frame portion 44. The side surfaces of the battery 46, i.e., the side wall portions that stand-up from the bottom plate 42, are surrounded by the battery frame portion 44.

The battery front side portions 48 are provided at the vehicle transverse direction both sides of the front end that sandwich the convex frame portion 44A of the battery frame portion 44 therebetween. The battery front side portion 48 has a bottom portion 48A that extends from the battery frame portion 44 toward the front side along the bottom plate 42, and an inclined portion 48B that extends obliquely toward the front and upper side from the front end of the bottom portion 48A. The bottom portion 48A is fixed to the bottom plate 42. An inclined surface 48B1, to which a connecting member 50 that is described later is mounted, is formed at the bottom surface of the inclined portion 48B. A forward-facing surface 48B2, which stands in the vehicle vertical direction and faces the front side, is formed at the front end of the inclined portion 48B. The rear end of the front side member 14 is fixed to the forward-facing surface 48B2.

The side rails 22 of the suspension member 20 and the battery front side portions 48 of the battery accommodating portion 40 are connected by the connecting members 50. The connecting member 50 has a front side connecting portion 52 and a rear side connecting portion 54. The connecting member 50 has a closed cross-section that is rectangular.

The front end of the front side connecting portion 52 is fixed to the rear end of the side rail 22 at further toward the rear side than the bolt 28, and the front side connecting portion 52 extends rearward substantially parallel to the side rail 22. As an example, the front side connecting portion 52 can be fixed to the side rail by arc welding. The front side connecting portion 52 is disposed at a position that overlaps the battery frame portion 44 as seen from the vehicle longitudinal direction. Namely, the front side connecting portion 52 is disposed at a position that overlaps the battery frame portion 44 in the vehicle vertical direction and left-right direction. Note that this overlapping may be partial overlapping or entire overlapping. Further, the front side connecting portion 52 is disposed further toward the outer side than the convex frame portion 44A in the vehicle transverse direction.

The rear side connecting portion 54 is bent toward the vehicle rear and lower side from the rear end of the front side connecting portion 52, and extends along the inclined surface 48B1, and is fixed to the inclined surface 48B1 of the battery front side portion 48. As an example, the rear side connecting portion 54 can be fixed to the inclined surface 48B1 of the battery front side portion 48 by bolts B 1.

The connecting member 50 is formed by a ductile member, and is an aluminum extrusion molded product that is manufactured by extrusion molding aluminum. The ductility of the connecting member 50 is set to be greater than that of the side rail 22. The bent portion, which is between the front side connecting portion 52 and the rear side connecting portion 54, of the connecting member 50 is a deforming portion 56.

As shown in FIG. 1 and FIG. 3, a non-contact charger 34 is disposed at the lower side of the suspension member 20. The non-contact charger 34 is a device for carrying out and charging of the battery 46 in a non-contact manner with a charger at the exterior. The non-contact charger 34 is rectangular as seen in plan view. The front end of the non-contact charger 34 is disposed between the front cross member 24 and the rear cross member 26, and the rear end is disposed at the front side of the convex frame portion 44A. Note that illustration of the non-contact charger 34 is omitted in drawings other than FIG. 1 and FIG. 3.

Operation of the present embodiment is described next.

When the vehicle 12 is involved in a front collision with an obstacle or the like, collision load is inputted to the front reinforcement 16 and the lower reinforcement 32 from the vehicle front side. The collision load is transmitted via the front reinforcement 16 to the battery front side portions 48. Further, the collision load is transmitted via the lower reinforcement 32, the side rails 22 and the connecting members 50 to the battery front side portions 48.

Figure 5:
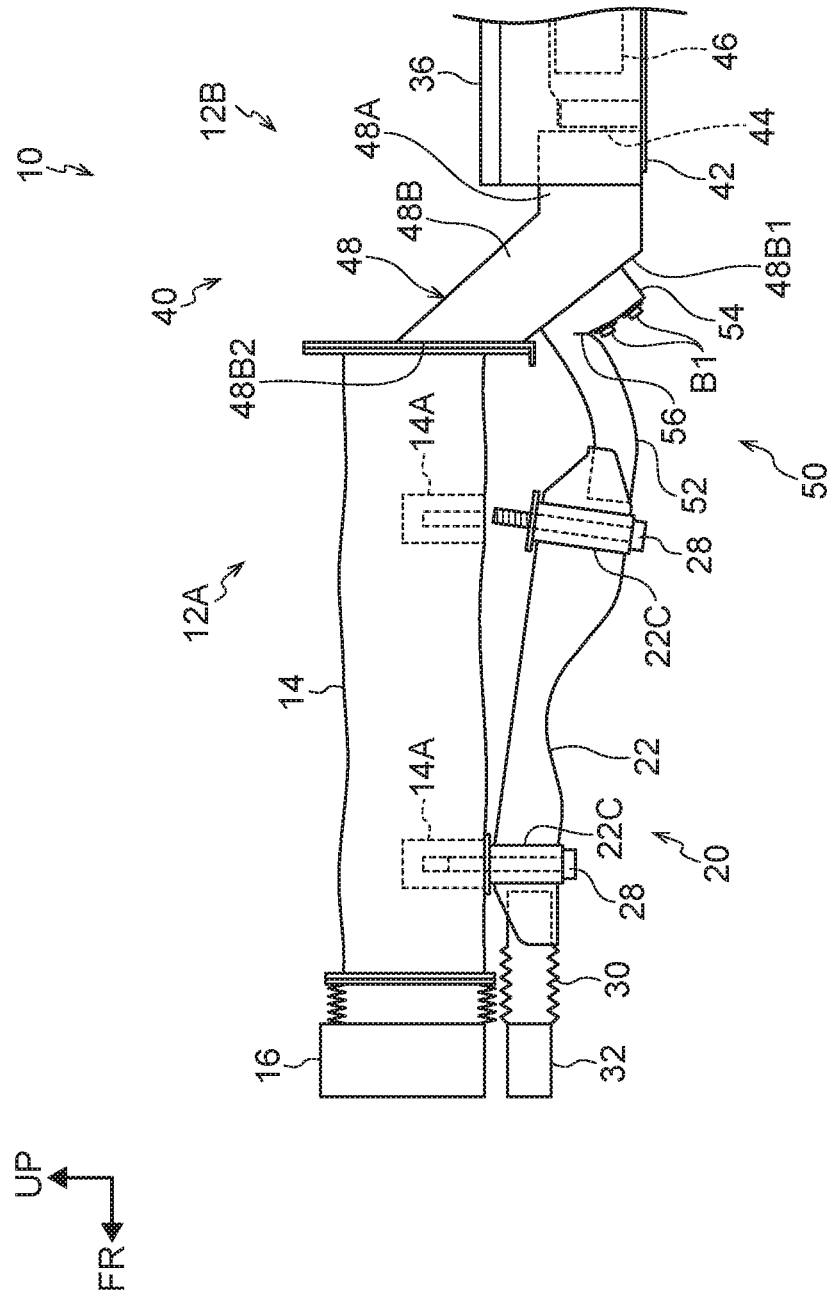
FIG. 5 is a side view showing a state in which collision load from the front side is inputted to the vehicle front portion structure of the present embodiment.

As shown in FIG. 5, the front reinforcement 16 and the lower reinforcement 32 deform, and collision energy that is due to the front collision is absorbed. In a case in which the collision energy cannot be completely absorbed by the deformation of the front reinforcement 16 and the lower reinforcement 32, the bolts 28 that support the rear end portions of the side rails 22 at the front side members 14 come apart from the bolt fastening portions 14A, and the front side connecting portions 52 of the connecting members 50 move downward with the deforming portions 56 being the starting point. Namely, the deforming portions 56 of the connecting members 50 bend, and the front side connecting portions 52 move downward. Further, depending on the magnitude of the impact load, the side rails 22 of the suspension member 20 are pushed rearward while breaking.

Due to the connecting members 50 deforming in this way, the collision load is absorbed, and input of impact to the battery 46 that is at the rear side thereof can be mitigated. Further, because the rear end portion of the suspension member 20 moves downward with respect to the battery accommodating portion 40, the suspension member 20 and members mounted to the suspension member 20, such as the gear box or the like for example, colliding with the battery can be suppressed.

Further, in the present embodiment, because the connecting members 50 are disposed at positions overlapping the battery frame portion 44 as seen from the vehicle longitudinal direction, the collision load from the vehicle front side can be received at the battery frame portion 44 via the battery front side portions 48. By making the battery frame portion 44 also function as a vehicle frame member, collision load from the vehicle front side is received at the battery frame portion 44, and can be transmitted through the battery frame portion toward the rear side.

In the present embodiment, because the side rails 22 of the suspension member 20 are aluminum die cast parts, complex shapes can be molded easily in a mold. Further, if the side rails 22 are aluminum die cast products, it is easy for the side rails 22 to break due to input of collision load. However, because the side rails 22 are disposed further toward the vehicle front side than the connecting members 50, the side rails 22 colliding with the battery accommodating portion 40 can be suppressed due to the side rails 22 moving toward the lower sides of the rear end portions of the connecting members 50.

Note that, in the present embodiment, the side rails 22 are aluminum die cast products, but, other than this, the side rails 22 may be formed as light metal (aluminum, magnesium) cast products, or of carbon fiber reinforced plastic (CFRP), or as extruded steel plates, or the like. Further, in the present embodiment, although the connecting members 50 are aluminum extrusion molded products, other than this, the connecting members 50 may be cast products of aluminum, or steel plates or the like.

Figure 6:
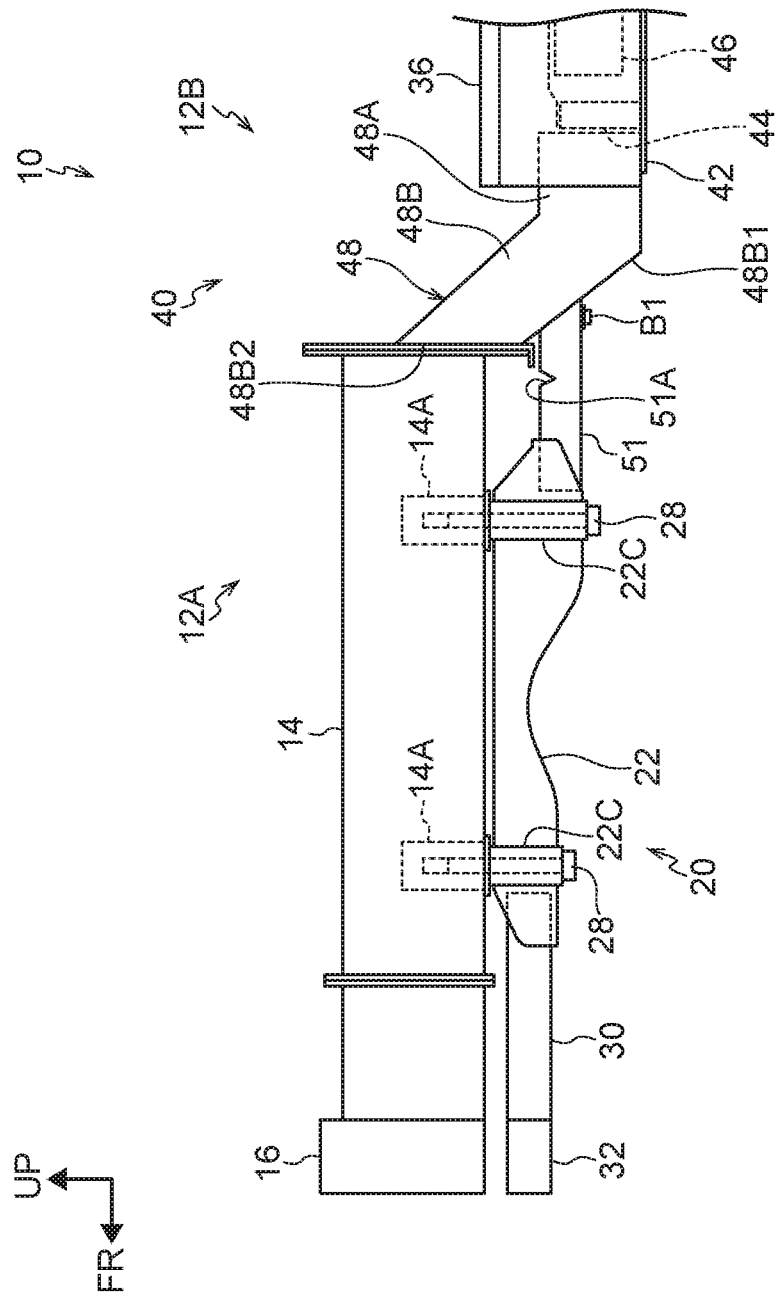
FIG. 6 is a side view showing a vehicle front portion structure relating to a modified example of the present embodiment.

Further, in the present embodiment, the connecting members 50 are deformed such that the rear end portions of the side rails 22 move downward with respect to the front portion of the battery accommodating portion 40, due to the deformed portions 56, which are the bent portions between the front side connecting portions 52 and the rear side connecting portions 54, being deformed. However, the connecting members 50 may be other shapes. For example, as shown in FIG. 6, connecting members 51 that are shaped to extend rectilinearly toward the rear from the side rails 22 may be provided as the connecting members, and cut-out portions 51A may be formed in the upper sides of the rear portions of these connecting members 51. In this case, the rear end portions of the side rails 22 can be moved toward the lower side with the cut-out portions 51A being the starting points. These cut-out portions 51A and the peripheries thereof are the deforming portions of the present invention.

Further, in the present embodiment, the connecting member 50 and the side rail 22 are formed as separate members and are arc-welded together, but the connecting member 50 can be structured integrally with the side rail 22. In this case, the connecting member 50 and the side rail 22 are molded integrally of the same material, and the ductility of the connecting member 50 is increased by a heat treatment or the like thereafter. For example, in a case in which the connecting member 50 and the side rail 22 are molded integrally by aluminum casting, the ductility of the portion corresponding to the connecting member 50 can be increased by subjecting the portion corresponding to the connecting member 50 to a T6 heat treatment or a T7 heat treatment. Further, in a case in which the connecting member 50 and the side rail 22 are molded integrally by a steel plate, the ductility of the portion corresponding to the connecting member 50 can be increased by carrying out an annealing treatment thereon.

A first aspect of a vehicle front portion structure that includes: a battery accommodating portion that is disposed at a vehicle lower side of a vehicle cabin, and in which a battery is to be accommodated; a suspension member that is provided further toward a vehicle front side than the battery accommodating portion, and that has a pair of side rails that are disposed with an interval therebetween in a vehicle transverse direction and that extend in a vehicle longitudinal direction; and connecting members that connect rear portions of the side rails and a front portion of the battery accommodating portion, and at which deforming portions that, due to input of collision load to the side rails from a vehicle front side, deform such that the rear portions of the side rails move toward a vehicle lower side with respect to the front portion of the battery accommodating portion are formed, the connecting members being formed by members having higher ductility than the side rails.

In the vehicle front portion structure of the first aspect, the battery is accommodated at the vehicle lower side of the vehicle cabin floor. Further, the suspension member is provided further toward the vehicle front side than the battery accommodating portion in which the battery is accommodated. The rear portions of the pair of side rails of the suspension member and the front portion of the battery accommodating portion are connected by the connecting members, and deforming portions are formed at the connecting members. Note that the connecting members may be formed integrally with the side rails, or may be formed as separate bodies.

The deforming portions deform due to input of collision load from the vehicle front side to the side rails, such that the rear portions of the side rails move downward with respect to the front portion of the battery accommodating portion. Namely, when collision load is inputted to the side rails from the vehicle front side, the connecting members deform, and the rear portions of the side rails move downward with respect to the front portion of the battery accommodating portion. Accordingly, with respect to impact from the vehicle front side, the suspension member, which is disposed further toward the vehicle front side than the connecting members, moves downward with respect to the front portion of the battery accommodating portion. Due thereto, input of impact to the battery can be mitigated, while the rear of the suspension member is moved downward with respect to the battery.

In the case of input of an excessive load, it is easy for the side rails whose ductility is relatively low to break. However, because the side rails are further toward the vehicle front side than the connecting members, a collision with the battery accommodating portion can be suppressed due to bending of the connecting members toward a vehicle rear and lower side.

Further, because the side rails can be formed by members whose ductility is lower than that of the connecting members, the degrees of freedom in designing the side rails can be ensured.

A second aspect is the first aspect of the vehicle front portion structure. In the second aspect, the connecting members have front side connecting portions that are connected to the rear portions of the side rails and extend toward a vehicle rear side, and rear side connecting portions that are bent from rear ends of the front side connecting portions toward a vehicle rear and lower side, and the deforming portions are bent portions that are formed between the front side connecting portions and the rear side connecting portions.

In the vehicle front portion structure of the second aspect, the deforming portions are structured by the bent portions that are formed between the front side connecting portions, which are connected to the rear portions of the side rails and extend toward the vehicle rear side, and the rear side connecting portions, which are bent toward a vehicle rear and lower side from the rear ends of the front side connecting portions. Due thereto, by a simple structure, with respect to impact from the vehicle front side, the rear portion of the suspension member is moved downward with respect to the front portion of the battery accommodating portion, and input of impact to the battery can be mitigated.

A third aspect is the first or the second aspect of the vehicle front portion structure. In the third aspect, the side rails are manufactured by aluminum die casting.

By manufacturing the side rails by aluminum die casting in this way, complex shapes can be manufactured easily in a mold. Further, by manufacturing the side rails by aluminum die casting, the ductility thereof can be made to be low.

A fourth aspect is any one of the first to the third aspect of the vehicle front portion structure. In the fourth aspect, the connecting members are aluminum extrusion molded products.

By making the connecting members be aluminum extrusion molded products in this way, the ductility of the connecting members can be made to be high, and, with respect to impact from the vehicle front side, the connecting members are bent stably, and the input of impact to the battery can be mitigated.

Further, in the case of input of an excessive load, it is easy for the side rails to break. However, because the positions of the breakage are further toward the vehicle front side than the connecting members, a collision with the battery accommodating portion of the suspension member can be suppressed due to bending of the connecting members toward a vehicle rear and lower side.

A fifth aspect is any one of the first to the fourth aspect of the vehicle front portion structure. In the fifth aspect, the battery accommodating portion has a battery frame portion that surrounds side surfaces of the battery, and the connecting members are disposed at positions overlapping with the battery frame portion, as seen from the vehicle longitudinal direction.

In the vehicle front portion structure of the fifth aspect, the connecting members are disposed at positions that overlap the battery frame portion as seen from the vehicle longitudinal direction. Therefore, collision load from the vehicle front side is received at the battery frame portion, and can also be transmitted through the battery frame portion toward the rear.

A sixth aspect is a vehicle front portion structure that includes a battery accommodating portion that is disposed at a vehicle lower side of a vehicle cabin, and in which a battery is to be accommodated; a suspension member that is provided further toward a vehicle front side than the battery accommodating portion, and that has a pair of side rails that are disposed with an interval therebetween in a vehicle transverse direction and that extend in a vehicle longitudinal direction; and connecting members that connect rear portions of the side rails and a front portion of the battery accommodating portion, and that have front side connecting portions that are connected to the rear portions of the side rails and extend toward a vehicle rear side, and rear side connecting portions that are bent from rear ends of the front side connecting portions toward a vehicle rear and lower side.

In the vehicle front portion structure of the sixth aspect, the battery is accommodated at the vehicle lower side of the vehicle cabin floor. Further, the suspension member is provided further toward the vehicle front side than the battery accommodating portion in which the battery is accommodated. The rear portions of the pair of side rails of the suspension member and the front portion of the battery accommodating portion are connected by the connecting members, and the connecting members have front side connecting portions and rear side connecting portions. Note that the connecting members may be formed integrally with the side rails, or may be formed as separate bodies.

When collision load is inputted to the side rails from the vehicle front side, the bent portions which are between the front side connecting portions and the rear side connecting portions of the connecting members deform, and the rear portions of the side rails move downward with respect to the front portion of the battery accommodating portion. Accordingly, with respect to impact from the vehicle front side, the suspension member, which is disposed further toward the vehicle front side than the connecting members, moves downward with respect to the front portion of the battery accommodating portion. Due thereto, the input of impact to the battery can be mitigated, while the rear of the suspension member is moved downward with respect to the battery.

A seventh aspect is the sixth aspect of the vehicle front portion structure. In the seventh aspect, the connecting members are formed by members having a ductility that is higher than that of the side rails.

In the vehicle front portion structure relating to the seventh aspect, the side rails can be formed by members whose ductility is lower than that of the connecting members. Therefore, the degrees of freedom in designing the side rails can be maintained.

In accordance with the vehicle front portion structure relating to the present disclosure, the input of impact to the battery can be mitigated, while the degrees of freedom in the designing of the suspension member are ensured.

What is claimed is:

1. A vehicle front portion structure comprising:
a battery accommodating portion that is disposed at a vehicle lower side of a vehicle cabin, and in which a battery is to be accommodated;
a suspension member that is provided further toward a vehicle front side than the battery accommodating portion, and that has a pair of side rails that are disposed with an interval therebetween in a vehicle transverse direction and that extend in a vehicle longitudinal direction; and
connecting members that connect rear portions of the side rails and a front portion of the battery accommodating portion, and at which deforming portions that, due to input of collision load to the side rails from a vehicle front side, deform such that the rear portions of the side rails move toward a vehicle lower side with respect to the front portion of the battery accommodating portion are formed, the connecting members being formed by members having higher ductility than the side rails,
wherein:
the connecting members have front side connecting portions that are connected to the rear portions of the side rails and extend toward a vehicle rear side, and rear side connecting portions that are bent from rear ends of the front side connecting portions toward a vehicle rear and lower side,
the deforming portions are bent portions that are formed between the front side connecting portions and the rear side connecting portions,
each of the connecting members is formed as a single body, and
each of the connecting members is connected to each of the pair of side rails.

2. The vehicle front portion structure of claim 1, wherein the side rails are manufactured by aluminum die casting.

3. The vehicle front portion structure of claim 1, wherein the connecting members are aluminum extrusion molded products.

4. The vehicle front portion structure of claim 1, wherein:
the battery accommodating portion has a battery frame portion that surrounds side surfaces of the battery, and
the connecting members are disposed at positions overlapping with the battery frame portion, as seen from the vehicle longitudinal direction.

5. A vehicle front portion structure comprising:
a battery accommodating portion that is disposed at a vehicle lower side of a vehicle cabin, and in which a battery is to be accommodated;
a suspension member that is provided further toward a vehicle front side than the battery accommodating portion, and that has a pair of side rails that are disposed with an interval therebetween in a vehicle transverse direction and that extend in a vehicle longitudinal direction; and
connecting members that connect rear portions of the side rails and a front portion of the battery accommodating portion, and that have front side connecting portions that are connected to the rear portions of the side rails and extend toward a vehicle rear side, and rear side connecting portions that are bent from rear ends of the front side connecting portions toward a vehicle rear and lower side,
wherein:
each of the connecting members is formed as a single body, and
each of the connecting members is connected to each of the pair of side rails.

6. The vehicle front portion structure of claim 5, wherein the connecting members are formed by members having a ductility that is higher than that of the side rails.

7. A vehicle front portion structure comprising:
a battery accommodating portion that is disposed at a vehicle lower side of a vehicle cabin, and in which a battery is to be accommodated;
a suspension member that is provided further toward a vehicle front side than the battery accommodating portion, and that has a pair of side rails that are disposed with an interval therebetween in a vehicle transverse direction and that extend in a vehicle longitudinal direction; and
connecting members that connect rear portions of the side rails and a front portion of the battery accommodating portion, that are connected to the rear portions of the side rails and extend toward a vehicle rear side, and that have cut-out portions in upper sides of rear portions thereof,
wherein:
each of the connecting members is formed as a single body, and
each of the connecting members is connected to each of the pair of side rails.

8. The vehicle front portion structure of claim 7, wherein the cut-out portions are between points at which the connecting members are attached to the front portion of the battery accommodating portion and the rear portions of the side rails.

9. The vehicle front portion structure of claim 7, wherein the cut-out portions have a depth with respect to the upper side of each connecting member less than an entire thickness of the connecting members.

10. The vehicle front portion structure of claim 7, wherein connecting members are separate from one another and are disposed with a space therebetween in the vehicle transverse direction.

11. The vehicle front portion structure of claim 7, wherein the side rails are manufactured by aluminum die casting.

12. The vehicle front portion structure of claim 7, wherein the connecting members are aluminum extrusion molded products.

13. The vehicle front portion structure of claim 7, wherein the side rails comprise a die cast material and the connecting members comprise a molded material.

14. The vehicle front portion structure of claim 1, wherein at least one of the side rails or the connecting members comprises aluminum.

15. The vehicle front portion structure of claim 1, wherein the side rails comprise a die cast material and the connecting members comprise a molded material.

16. The vehicle front portion structure of claim 1, wherein the connecting members are separate from one another and are disposed with a space therebetween in the vehicle transverse direction.

17. The vehicle front portion structure of claim 5, wherein connecting members are separate from one another and are disposed with a space therebetween in the vehicle transverse direction.

18. The vehicle front portion structure of claim 5, wherein the side rails are manufactured by aluminum die casting and the connecting members are aluminum extrusion molded products.

19. The vehicle front portion structure of claim 5, wherein the side rails comprise a die cast material and the connecting members comprise a molded material.

20. The vehicle front portion structure of claim 5, wherein at least one of the side rails or the connecting members comprises aluminum.

\* \* \* \* \*